Dec. 29, 1942. T. M. LINVILLE 2,306,736
DYNAMO-ELECTRIC MACHINE
Filed Dec. 24, 1941 2 Sheets-Sheet 2

Inventor:
Thomas M. Linville,
by Harry E. Dunham
His Attorney.

Patented Dec. 29, 1942

2,306,736

UNITED STATES PATENT OFFICE 2,306,736

DYNAMOELECTRIC MACHINE

Thomas M. Linville, Schenectady, N. Y., assignor to General Electric Company, a corporation of New York Application June 24, 1941, Serial No. 399,477

17 Claims. (Cl. 171—252)

My invention relates to improvements in dynamo-electric machines.

An object of my invention is to provide an improved ventilating or cooling system for dynamo-electric machines.

Another object of my invention is to provide an improved dynamo-electric machine and a ventilating system for the same.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
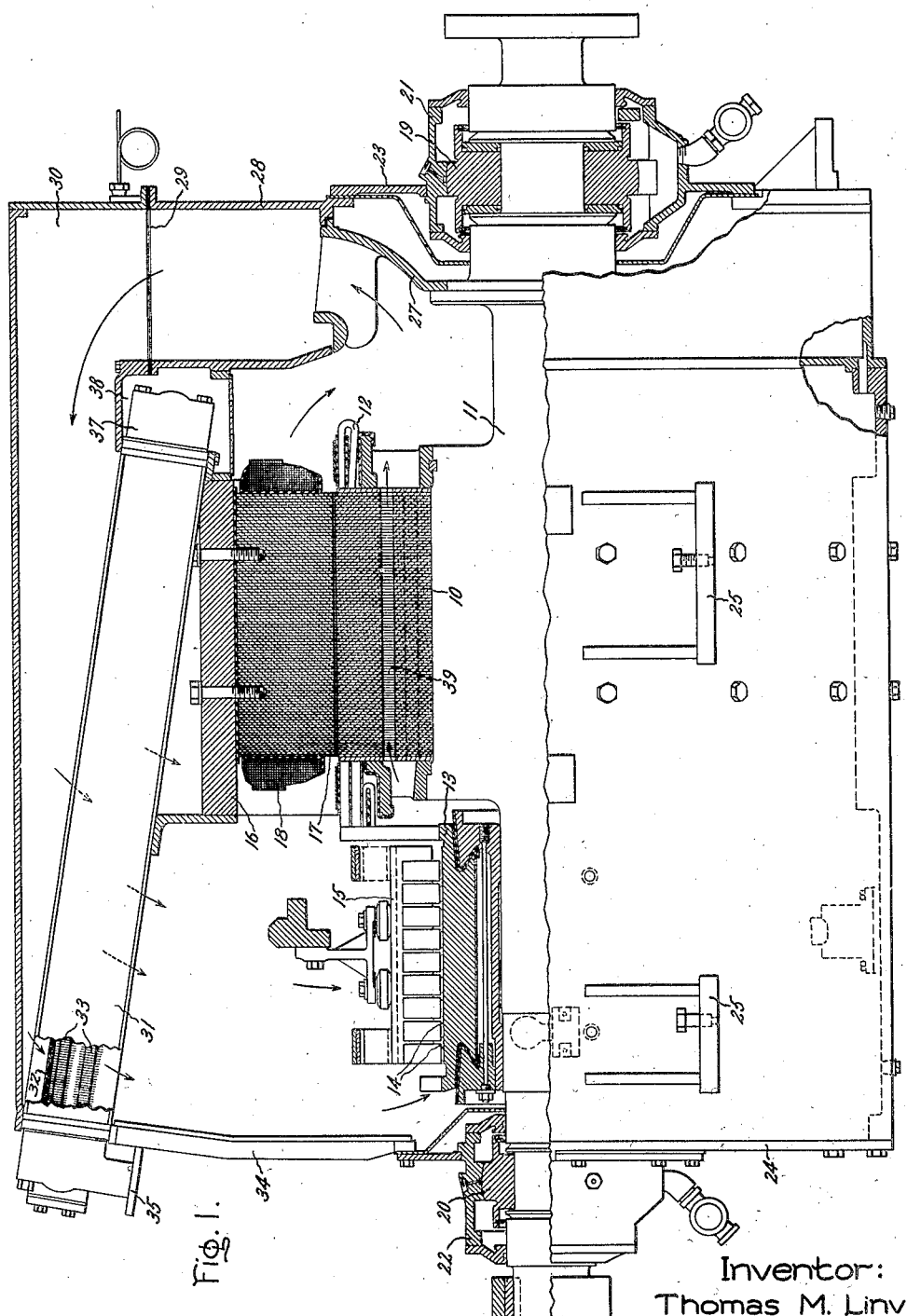
Figure 2:
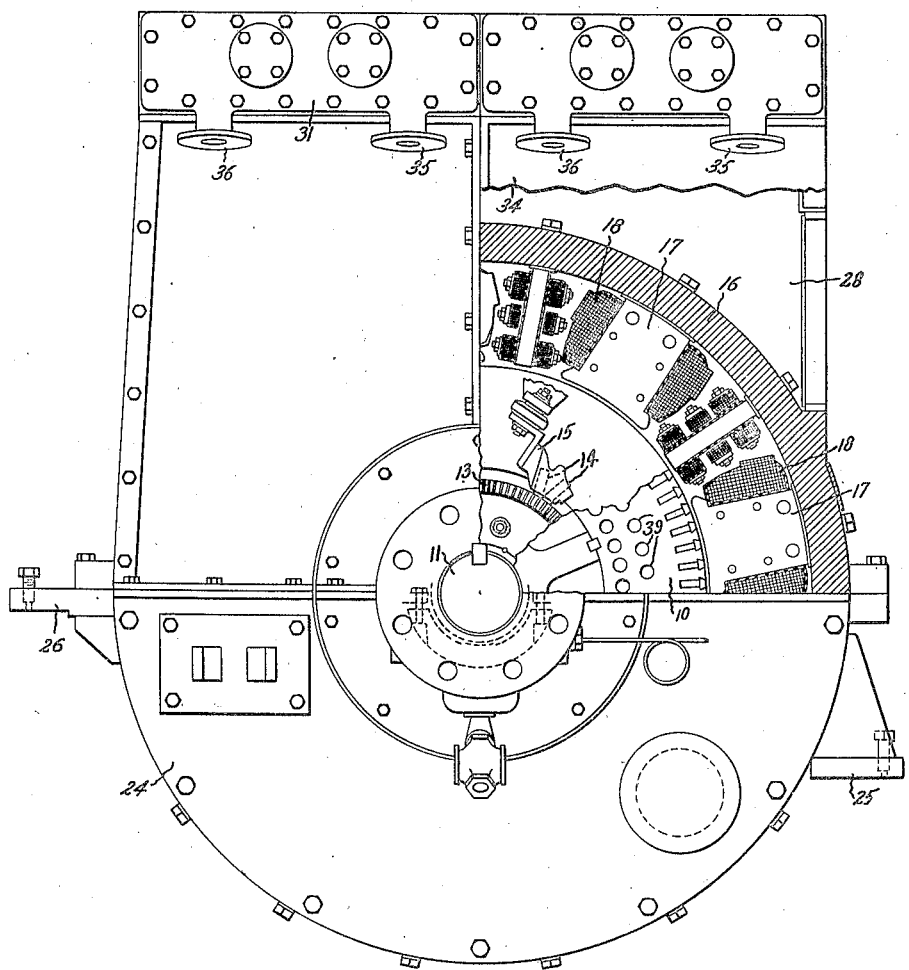

In the drawings, Fig. 1 is a side elevational view, partly broken away, illustrating a dynamo-electric machine provided with an embodiment of my invention; and Fig. 2 is an end view, partly broken away, of the machine shown in Fig. 1.

Referring to the drawings, I have shown a dynamo-electric machine having a rotatable member provided with a core 10 mounted on a horizontally extending shaft 11. The rotatable member is provided with an armature winding 12 electrically connected to a commutator 13 to which electric current is supplied by a plurality of brushes 14 supported in a brush holder 15. The rotatable member is adapted to react electrodynamically with a stationary member having a magnet frame 16 and pole pieces 17 provided with field exciting windings 18. Bearings 19 and 20 are arranged at each end of the rotatable member for rotatably supporting the shaft 11 and are mounted in bearing housings 21 and 22 secured to end shield members 23 and 24, respectively of the stationary member of the machine, and the machine is adapted to be supported by feet 25 and 26 arranged on diametrically opposite sides thereof.

A ventilating medium is adapted to be circulated through the machine from one end to the other by a ventilating medium impeller 27 mounted on the rotatable member shaft 11 at the end thereof opposite the commutator 13. A ventilating impeller scroll housing 28 is arranged about the ventilating medium impeller with an exhaust opening 29 arranged in communication with the wide end of a wedge-shaped ventilating medium duct 30 formed above the machine and arranged in communication with the open side of a relatively thin ventilating medium cooler 31. This cooler 31 is arranged above the machine in a position inclined to the horizontal axis of the rotatable member of the machine with one end thereof lower or closer to the axis of the machine than the other end and arranged adjacent the ventilating medium impeller and the exhaust opening 29 of the impeller casing. The ventilating medium is filtered to remove foreign substances, such as carbon dust from the brushes 14, by arranging a filter 32 of glass wool or other suitable filter material over heat transfer tubes 33 of the cooler 31. This filter can be arranged in any convenient location in the path of flow of the ventilating medium and, since a relatively large area is presented by the top of the cooler 31, the illustrated arrangement minimizes the drop in pressure head through the filter, as it need not be as thick as would be required with a smaller area filter. In order to minimize further the loss of pressure head in the ventilating medium as it passes through the cooler 31 from the impeller 27, this cooler is formed of two sections which are relatively shallow and are approximately the same total width and length as the width and length of the dynamo-electric machine. Such an arrangement presents a relatively large heat-transfer surface to the ventilating medium which passes through the cooler, and its relatively small depth facilitates the passage of ventilating medium through the cooler without undue loss of pressure or velocity head. Furthermore, the wedge-shaped ventilating duct 30 and the inclined arrangement of the cooler 31 with the higher end of the cooler adjacent the cmmutator and the thinner end of the duct 30 enables the provision of an efficient scroll housing about the impeller 27 for directing ventilating medium therebetween and provides a maximum distance at the exhaust end of the housing for efficient operation of the impeller. An end plate 34 is arranged about the end of the machine adjacent the commutator and adjacent the higher end of the cooler 31 and forms a side to the enclosing casing which provides an enclosure with the adjacent and higher end of the cooler for directing ventilating medium circulated between the cooler and the dynamo-electric machine downwardly towards the ventilating intake end of the machine. In order to minimize the possibility of contamination of the ventilating medium by cooling medium in the cooler, all connections from the cooling medium source of supply to the cooler 31 are made outside of the machine enclosing housing or casing by intake header connections 35 and outlet header connections 36 to the higher end of the cooler arranged outside the enclosing casing side 34. A recirculating header 37 is connected to the other end of the cooler for returning and recirculating the cooling medium from the intake connection 35 to the outlet connection 36 and is arranged at the lower end of the cooler within an enclosing chamber 38, so as substantially to isolate the header 37 from contact with ventilating medium in the machine. With such an arrangement, the ventilating medium is drawn through the dynamo-electric machine about the pole pieces 17, over the commutator 13, and through axially extending air ducts 39 in the armature core 10. It is then blown by the impeller into the impeller housing 28 through the wedge-shaped ventilating medium duct 30 covering the outer side of the cooler 31, through the air filter 32, into contact with the heat-transfer tubes 33 of the cooler 31, through the cooler, about the upper side of the stationary member frame 16, and into the end of the machine enclosed by the end plate 34, from which it is recirculated through the machine, as indicated by the arrows in Fig. 1.

While I have illustrated and described a particular embodiment of my invention, modifications thereof will occur to those skilled in the art. I desire it to be understood, therefore, that my invention is not to be limited to the particular arrangement disclosed, and I intended in the appended claims to cover all modifications which do not depart from the spirit and scope of my invention.

What I claim as new and desire to secure by Letters Patent of the United States, is:

1. A ventilating system for dynamo-electric machines including a dynamo-electric machine having a stationary member, means for circulating ventilating medium from one end of said machine to the other end thereof, a ventilating medium duct on one side of said machine, and means including a relatively thin cooler inclined to the axis of said machine within said duct forming a substantially wedge-shaped duct on one side thereof for cooling and for conducting ventilating medium from said other end to said first-mentioned end of said dynamo-electric machine with a minimum drop in pressure.

2. A ventilating system for dynamo-electric machines including a dynamo-electric machine having a stationary member, means for circulating ventilating medium from one end of said machine to the other end thereof, a ventilating medium duct on one side of said machine and means including a relatively thin cooler of substantially the length and width of said machine arranged inclined to the axis of said machine within said duct forming a substantially wedge-shaped duct on one side thereof for cooling and for conducting ventilating medium from said other end to said first-mentioned end of said dynamo-electric machine with a minimum drop in pressure.

3. A dynamo-electric machine including a stationary member and a rotatable member having a winding and a commutator connected thereto, a ventilating medium cooler arranged on one side of said dynamo-electric machine and inclined relatively to the axis of said machine, a substantially wedge-shaped ventilating medium duct covering one side of said cooler, a recirculating header connected to one end of said cooler, an enclosing chamber about said recirculating header arranged substantially to isolate said header from contact with ventilating medium, and means for circulating ventilating medium through said machine.

4. A ventilating system for dynamo-electric machines including a dynamo-electric machine having a stationary member, means for circulating ventilating medium from one end of said machine to the other end thereof, means including a ventilating medium duct and a relatively thin cooler inclined to the axis of said machine in said duct forming a substantially wedge-shaped duct for cooling and for conducting ventilating medium from said other end to said first-mentioned end of said dynamo-electric machine with a minimum drop in pressure, and means including a filter arranged in the path of flow of ventilating medium through said cooler for removing foreign substances therefrom.

5. A ventilating system for dynamo-electric machines including a dynamo-electric machine having a stationary member, means for circulating ventilating medium from one end of said machine to the other end thereof, means including a ventilating medium duct and a relatively thin cooler having heat-transfer tubes and being inclined to the axis of said machine and to one side of said duct for cooling and for conducting ventilating medium from said other end to said first-mentioned end of said dynamo-electric machine with a minimum drop in pressure, and means including a filter arranged over said cooler in the path of flow of ventilating medium for removing foreign substances therefrom.

6. A dynamo-electric machine including a stationary member and a rotatable member having a winding and a commutator connected thereto, means including a ventilating medium impeller for circulating ventilating medium through said machine, a ventilating medium duct, a ventilating medium cooler of relatively small depth arranged in said duct on the upper side of said dynamo-electric machine in a position inclined to the axis of said rotatable member and to one side of said duct with the end thereof adjacent said impeller lower than the other end thereof, a recirculating header connected to said lower end of said cooler, and an enclosing chamber about said recirculating header arranged substantially to isolate said header from contact with said ventilating medium.

7. A dynamo-electric machine including a stationary member and a rotatable member having a winding and a commutator connected thereto, a ventilating medium duct, a ventilating medium cooler of relatively small depth arranged in said duct on the upper side of said dynamo-electric machine in a position inclined to the axis of said rotatable member and to one side of said duct with the end thereof adjacent said commutator higher than the other end thereof, means for connecting a cooling medium source of supply to said higher end of said cooler for circulating cooling medium through said cooler, a recirculating header connected to the lower end of said cooler, an enclosing chamber about said recirculating header arranged substantially to isolate said header from contact with said ventilating medium, and means including a ventilating medium impeller for circulating ventilating medium through said machine and said cooler.

8. A dynamo-electric machine including a stationary member and a rotatable member having a winding and a commutator connected thereto, means including a ventilating medium impeller for circulating ventilating medium through said machine, a ventilating medium cooler of substantially the length and width of said dynamo-electric machine and having a relatively small depth, said cooler being arranged on the upper side of said dynamo-electric machine in a position inclined to the axis of said rotatable member with the end thereof adjacent said impeller lower than the other end thereof, a wedge-shaped ventilating medium duct over said cooler with the relatively wider end thereof adjacent said lower end of said cooler, and means including an impeller housing extending about said impeller for directing ventilating medium from said impeller to the relatively wider end of said wedge-shaped duct.

9. A dynamo-electric machine including a stationary member and a rotatable member having a winding and a commutator connected thereto, means for circulating ventilating medium through said machine, a ventilating medium cooler of relatively small depth arranged on the upper side of said dynamo-electric machine in a position inclined to the axis of said rotatable member with the end thereof adjacent said ventilating medium circulating means lower than the other end thereof, a wedge-shaped ventilating medium duct over said cooler with the relatively wider end therof adjacent said lower end of said cooler, means including a housing for directing ventilating medium between said circulating means and the relatively wider end of said wedge-shaped duct, and means for connecting a cooling medium source of supply to said other end of said cooler for circulating cooling medium through said cooler.

10. A dynamo-electric machine including a stationary member and a rotatable member having a winding and a commutator connected thereto, means including a ventilating medium impeller for circulating ventilating medium through said machine, a ventilating medium cooler of relatively small depth arranged on one side of said dynamo-electric machine in a position inclined to the axis of said rotatable member with the end thereof adjacent said impeller closer to the axis of said machine than the other end thereof, a wedge-shaped ventilating medium duct covering an outer side of said cooler with the relatively wider end thereof adjacent said closer axis end of said cooler, means including a housing extending about said impeller for directing ventilating medium between said impeller and said relatively wider end of said wedge-shaped duct, and means for connecting a cooling medium source of supply to said other end of said cooler for circulating cooling medium through said cooler.

11. A dynamo-electric machine including a stationary member and a rotatable member having a winding and a commutator connected thereto, a ventilating medium cooler of relatively small depth arranged on the upper side of said dynamo-electric machine in a position inclined to the axis of said rotatable member with the end thereof adjacent said commutator higher than the other end thereof, a wedge-shaped ventilating medium duct over said cooler with the relatively thinner end thereof adjacent said higher end of said cooler, means for connecting a cooling medium source of supply to said higher end of said cooler for circulating cooling medium through said cooler, means including a ventilating medium impeller for circulating ventilating medium through said machine and said cooler, and means including an impeller housing extending about said impeller for directing ventilating medium between said impeller and the relatively wider end of said wedge-shaped duct.

12. A dynamo-electric machine including a stationary member and a rotatable member having a winding and a commutator connected thereto, means including a ventilating medium impeller mounted on said rotatable member for circulating ventilating medium through said machine, a ventilating medium cooler of substantially the length and width of said dynamo-electric machine and having a relatively small depth, said cooler being arranged on the upper side of said dynamo-electric machine in a position inclined to the horizontal with the end thereof adjacent said impeller lower than the other end thereof, means including an enclosing casing side extending about an end of said dynamo-electric machine and providing an enclosure with the adjacent higher end of said cooler for directing ventilating medium circulated between said cooler and said dynamo-electric machine members, and means for connecting a cooling medium source of supply to said higher end of said cooler outside of said enclosing casing side for circulating cooling medium through said cooler.

13. A dynamo-electric machine including a stationary member and a rotatable member having a winding and a commutator connected thereto, a ventilating medium cooler of substantially the length and width of said dynamo-electric machine and having a relatively small depth, said cooler being arranged on the upper side of said dynamo-electric machine in a position inclined to the horizontal with the end thereof adjacent said commutator higher than the other end thereof, means including an enclosing casing side extending about the commutator end of said dynamo-electric machine and providing an enclosure with the adjacent end of said cooler for directing ventilating medium circulated from said cooler to said dynamo-electric machine members, means for connecting a cooling medium source of supply to said higher end of said cooler outside of said enclosing casing side for circulating cooling medium through said cooler, a recirculating header connected to the lower end of said cooler, an enclosing chamber about said recirculating header arranged substantially to isolate said header from contact with said ventilating medium, and means including a ventilating medium impeller mounted on said rotatable member on the end thereof opposite said commutator for circulating ventilating medium through said machine and said cooler.

14. A dynamo-electric machine including a stationary member and a rotatable member having a winding and a commutator connected thereto, a ventilating medium cooler of relatively small depth arranged on the upper side of said dynamo-electric machine in a position inclined to the axis of said rotatable member with the end thereof adjacent said commutator higher than the other end thereof, a wedge-shaped ventilating medium duct over said cooler with the relatively thinner end thereof adjacent said higher end of said cooler, means for connecting a cooling medium source of supply to said higher end of said cooler for circulating cooling medium through said cooler, a recirculating header connected to the lower end of said cooler, an enclosing chamber about said recirculating header arranged substantially to isolate said header from contact with ventilating medium, means including a ventilating medium impeller mounted on said rotatable member on the end thereof opposite said commutator for circulating ventilating medium through said machine and said cooler, and means including an impeller housing extending about said impeller for directing ventilating medium between said impeller and the relatively wider end of said wedge-shaped duct.

15. A dynamo-electric machine including a stationary member and a rotatable member having a winding and a commutator connected thereto, a ventilating medium cooler of substantially the length and width of said dynamo-electric machine and having a relatively small depth, said cooler being arranged on the upper side of said dynamo-electric machine in a position inclined to the axis of said rotatable member with the end thereof adjacent said commutator higher than the other end thereof, a wedge-shaped ventilating medium duct over said cooler with the relatively thinner end thereof adjacent said higher end of said cooler, means for connecting a cooling medium source of supply to said higher end of said cooler for circulating cooling medium through said cooler, a recirculating header connected to the lower end of said cooler, an enclosing chamber about said recirculating header arranged substantially to isolate said header from contact with said ventilating medium, means including a ventilating medium impeller for drawing ventilating medium through said machine and circulating the same through said cooler, and means including an impeller housing extending about said impeller for directing ventilating medium from said impeller to the relatively wider end of said wedge-shaped duct.

16. A dynamo-electric machine including a stationary member and a rotatable member having a winding and a commutator connected thereto, means including a ventilating medium impeller mounted on said rotatable member for circulating ventilating medium through said machine, a ventilating medium cooler of substantially the length and width of said dynamo-electric machine and having a relatively small depth, said cooler being arranged on the upper side of said dynamo-electric machine in a position inclined to the horizontal with the end thereof adjacent said impeller lower than the other end thereof, means including an enclosing casing side extending about an end of said dynamo-electric machine and providing an enclosure with the adjacent higher end of said cooler for directing ventilating medium circulated between said cooler and said dynamo-electric machine members, means for connecting a cooling medium source of supply to said higher end of said cooler outside of said enclosing casing side for circulating cooling medium through said cooler, a recirculating header connected to the lower end of said cooler, and an enclosing chamber about said recirculating header arranged substantially to isolate said header from contact with said ventilating medium.

17. A dynamo-electric machine including a stationary member and a rotatable member having a winding and a commutator connected thereto, a ventilating medium cooler of substantially the length and width of said dynamo-electric machine and having a relatively small depth, said cooler being arranged on the upper side of said dynamo-electric machine in a position inclined to the horizontal with the end thereof adjacent said commutator higher than the other end thereof, a wedge-shaped ventilating medium duct over said cooler with the relatively thinner end thereof adjacent said higher end of said cooler, means including an enclosing casing side extending about the commutator end of said dynamo-electric machine and providing an enclosure with the adjacent end of said cooler for directing ventilating medium circulated between said cooler and said dynamo-electric machine members, means for connecting a cooling medium source of supply to said higher end of said cooler outside of said enclosing casing side for circulating cooling medium through said cooler, a recirculating header connected to the lower end of said cooler, an enclosing chamber about said recirculating header arranged substantially to isolate said header from contact with ventilating medium, means including a ventilating medium impeller mounted on said rotatable member on the end thereof opposite said commutator for circulating ventilating medium through said machine and said cooler, and means including a scroll impeller housing extending about said impeller for directing ventilating medium between said impeller and the relatively wider end of said wedge-shaped duct.

THOMAS M. LINVILLE.